Patented May 12, 1942

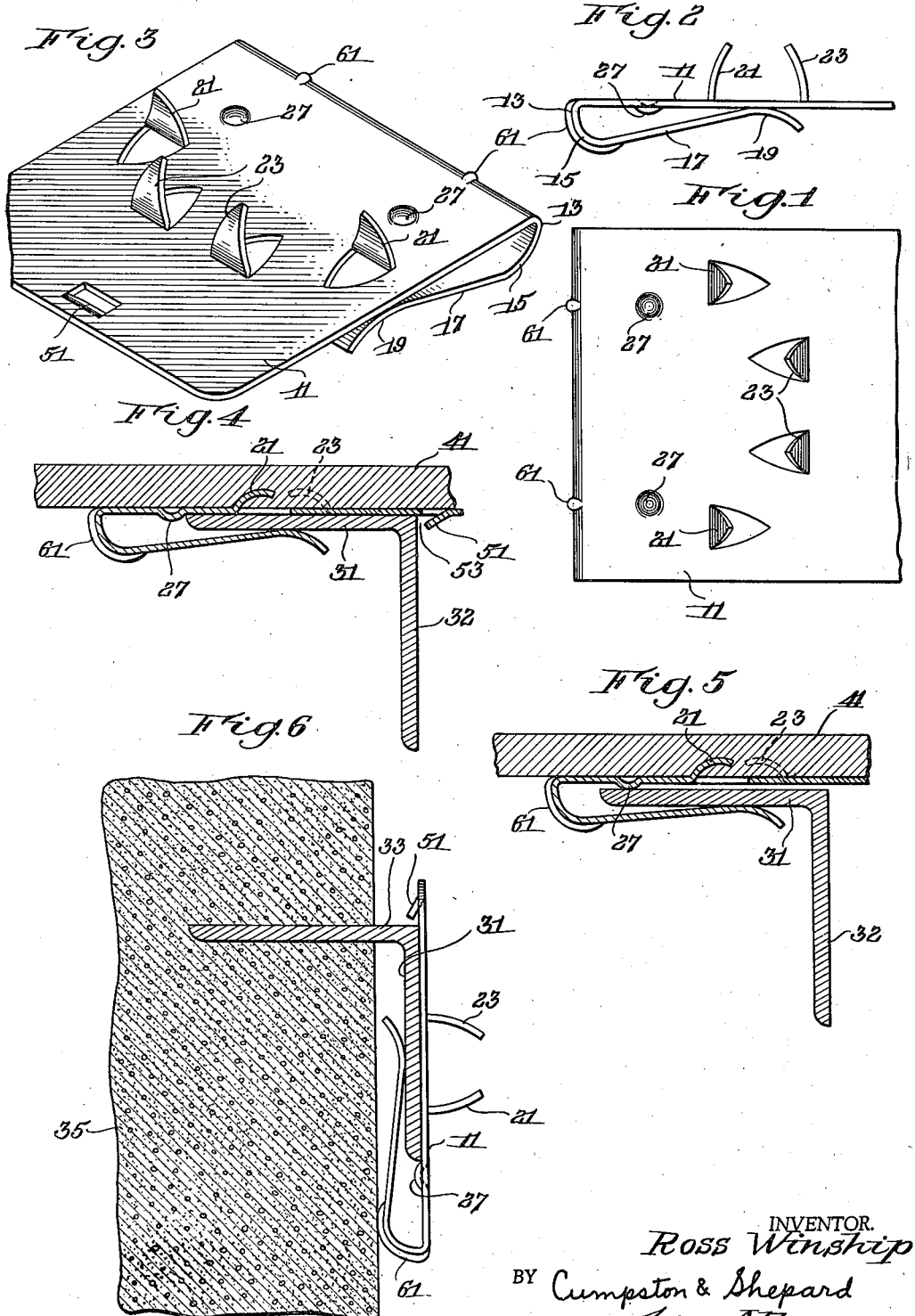

2,282,631

UNITED STATES PATENT OFFICE 2,282,631

FASTENER FOR WALLBOARDS AND THE LIKE

Ross Winship, Lockport, N. Y., assignor to The Upson Company, Lockport, N. Y., a corporation of New York Application February 17, 1941, Serial No. 379,229

9 Claims. (Cl. 72—118)

This invention relates to means for fastening wallboard or similar panels to frame members.

An object of the invention is the provision of a fastener suitable for attaching wallboard to metal frame members, without the use of nails.

Another object is the provision of such a fastener so designed and constructed as to allow limited movement relative to a frame member on which it is mounted, to permit expansion and contraction of the wallboard in accordance with changing atmospheric conditions.

A further object is the provision of a fastener so designed that a normal hammer blow used in driving the fastener onto a metal frame member will not injure the fastener or deform it in an undesirable manner.

A still further object is the provision of fastening means of such form that, when used for walls of a temporary or movable nature, the wallboard panels may be removed or taken down without damage to either the panels or the fastening means.

To these and other ends the invention resides in certain improvements and combinations of parts, all as will be hereinafter more fully described, the novel features being pointed out in the claims at the end of the specification.

In the drawing:

Fig. 1 is a plan of a fastener in accordance with a preferred embodiment of the invention;

Fig. 2 is an end view thereof;

Fig. 3 is a perspective view thereof;

Fig. 4 is a horizontal section through a fragment of a wall showing a metal stud or frame member, a fastener of the present invention mounted thereon, and a wallboard mounted on the fastener.

Fig. 5 is a view similar to Fig. 4, showing a different position of the parts caused by expansion or contraction of the wallboard with varying atmospheric conditions;

Fig. 6 is a horizontal cross section through a fragment of a wall illustrating the applicability of the fastener to a wall of masonry construction.

The same reference numerals throughout the several views indicate the same parts.

So-called "blind fasteners" for wallboard are well known in a general way. One form of such fastener is shown in Winship Patent 2,120,049, granted June 7, 1938, but the form of fastener there shown requires nails for fastening it to a support. Consequently, such fastener is not well adapted for use with masonry walls or with walls having steel or other metal studding or framing. In using fasteners of the type shown in this patent on such walls, it has heretofore been necessary to secure a strip of wood to the metal framing in order to provide material for receiving the nails used in holding the fastener in place. In masonry construction, it has been necessary to use wooden furring strips.

The present invention obviates the use of any wood, and provides a wallboard fastener of the "blind" type which may be attached directly to metal studding or framing, or to a metal insert suitably placed in a masonry wall.

Referring now to Fig. 1, the fastener comprises a metallic plate having a flat main body portion or front portion 11, from one edge of which the plate is bent backwardly on a sharp bend or corner 13 of somewhat more than 90°, followed by a more gradual bend or corner 15, beyond which is an approximately flat rear portion 17 lying behind the main body 11 and terminating in a curved lip 19, the edge of which is spaced somewhat inwardly from the edge of the body portion 11 and also somewhat to the rear of the portion 11, as shown.

Struck up from the main body 11 are suitable pointed ears or prongs 21 and 23 slightly curved, as shown. These ears may be arranged in two or more lines, and may be curved inwardly toward each other, as indicated in the drawings of the present application, or some of the ears may be curved inwardly toward each other and some may be curved outwardly away from each other, as indicated in said Winship Patent 2,120,049. The details of arrangement and spacing of the ears are immaterial so far as the present invention is concerned. The number, size, spacing, and curvature of the prongs may be varied according to the character and thickness of the wallboard material with which they are to be used, such as soft fibrous insulation board, plaster board, laminated fiber board, wood veneer, etc.

The metal of which the fastener of the present invention is made, is somewhat springy or resilient, and the fastener is so formed that the curved lip 19 tends resiliently to press against the rear surface of the front or main body portion 11, but can be forced away from the portion 11. These parts act as a spring clip, which may be thrust over the edge of any suitable flange 31, such as a flange forming part of a metal stud or frame member 32, as in Fig. 4, or a flange forming part of a metal insert or stay 33 set into a masonry wall 35, as in Fig. 6.

A pair of bumped up bosses or protuberances 27 formed in the front portion 11, project rearwardly therefrom at some distance laterally from the bend 13, 15. These protuberances 27 serve as automatic spacing means to space the bend 13, 15 from the edge of the flange 31, as seen in Figs. 4 and 6, so that there is little or no danger of thrusting the fastener so far onto the flange that the edge of the flange is tight up against the bend 13, 15. Hence, when these fasteners are properly installed, there is always a substantial distance (say about 3/8 inch, for example) between the edge of the flange on which they are mounted, and the bend 13, 15 or folded edge of the fastener. This spacing permits a further movement of the parts, if necessary, when the wallboard expands or contracts with atmospheric changes.

Another feature of the present invention is the sharp bend 13, which bend is slightly more than 90° in extent, so that the material between the bend 13 and the bend 15 is sloped obliquely away from a line drawn tangent to the bend 13, and perpendicular to the plane of the portion 11. If a workman uses a hammer to drive the fastener onto the flange of the frame member, and swings the hammer so as to hit against the curved edge of the fastener, the hammer blow will normally fall on the sharp corner 13 rather than on the metal between the corners 13 and 15, so there will be no tendency of such a hammer blow to deform the metal between the corners 13 and 15 in such a way as to tend to open the portions 11 and 17 away from each other, thus undesirably decreasing the spring force.

Another feature of the fastener is the fact that the curved lip 19 is so placed that it engages the rear face of the front portion 11, or the rear face of the metal flange on which the article is mounted, substantially along a line directly behind the middle of the rows of prongs 21 and 23. The spacing of the portions 11 and 17 from each other at the folded edge where they are joined together (13 and 15) is made great enough to accommodate the thickest flange on which it is likely that the fastener will be mounted, and still leave a little space or leeway. But the same fastener may be used on any flange thinner than this. For example, a fastener designed to accommodate a flange 3/16 of an inch in thickness, as a maximum, will hold perfectly on a flange of 1/8 or 1/16 inch in thickness. Regardless of differences in the thickness of the flange, causing the lip 19 to be forced varying distances away from the front portion 11, in any case the contact of the lip 19 with the rear surface of the flange will be approximately opposite the midpoint between the rows of prongs 21 and 23, thus giving the front portion 11 a firm mounting on the flange, with the holding force centralized with respect to the prongs.

In use, the metal studs or other frame members are erected in the usual way, or suitable metal inserts are placed in masonry walls, or if wooden framing is used, suitable metal flanges may be nailed or otherwise secured to the wooden framing members. Then the spring clip fasteners of the present invention are applied at appropriate intervals to the proper metal flanges of the structure, forcing the resilient fastening clips onto the flanges until the protuberances 27 on the clips come against the edges of the flanges as in Figs. 4 and 6, these protuberances then giving increased resistance to further movement and thus indicating to the workman that the fastening clips have been properly positioned, far enough on the flanges.

Then the wallboard 41 is placed against the protruding prongs of the erected fastening clips, and is driven against such prongs by a smart blow on the front face of the wallboard or, preferably, on a piece of wood placed against the front face of the wallboard so that the hammer blow will not mar the wallboard itself. As the wallboard is driven onto the prongs 21 and 23, these prongs enter the wallboard and bend over in the wallboard, to a final position somewhat as shown in Fig. 4, thus securely anchoring the wallboard to the fastener.

It is well known that wallboard of certain types is subject to expansion or contraction with varying atmospheric conditions, particularly with varying amounts of moisture in the atmosphere. Such expansion or contraction sets up forces of considerable magnitude. The spring clip fastener of the present invention is adapted to move relatively to the flange on which it is mounted in any direction in the plane of the wall, so that it is well adapted to move as required by the expansion and contraction of the wallboard, without causing breakage or buckling of the wallboard.

If the expansion or contraction forces are such that the wallboard 41 in Fig. 4 tends to move leftwardly relatively to the stationary flange 31 of frame member 32, such leftward movement simply slides the spring clip fastener a slight distance leftwardly on the flange, without disturbing the relation between the fastener and the wallboard, and without disturbing the resilient anchoring of the fastener to the frame member. On the other hand, if the expansion or contraction forces are such that the wallboard 41 tends to move rightwardly when viewed as in Fig. 4, such movement is possible because, under the influence of the considerable forces produced by expansion or contraction, the bumps 27 will ride up over the edge and along the front face of the flange 31, to a position such as indicated in Fig. 5. The height of the bumps 27 is sufficiently small so that they will ride easily over the edge of the flange 31, without causing undue resistance. If a subsequent change in atmospheric conditions produces a reverse movement, the fastener simply slides leftwardly again toward its original position. Of course the fastener may also move lengthwise of the flange 31, parallel to its edge. The wallboard itself is preserved from injury at all times, and is securely held in its intended plane, regardless of the slight motions which the spring clip fastener may make, in any direction parallel to the plane of the wall.

If wallboard is to be erected merely temporarily, as in building sets for motion picture photography, then care is taken to orient all of the spring clip fasteners in the same direction. Thus each panel of wallboard may be removed from the frame members by sliding the panel laterally in the appropriate direction until all of the spring clip fasteners of such panel have been pulled laterally off of the respective flanges on which they were mounted. This does not damage the wallboard panel, nor disconnect the fasteners from the panel.

If the wallboard is to be erected premanently rather than temporarily, it may be advisable to provide each fastener with latch means or stop means to prevent lateral removal from the metal framing in the manner just described. For example, a lug 51 may be struck from the plate 11 near its edge remote from the bend 13, at such a distance from the bosses 27 as will leave a substantial space 53 between the lug and the adjacent edge of the metal flange 31, to allow adequate slipping movement of the fastener on the metal frame member during the above described expansion or contraction of the wallboard. Upon attempted movement through more than the predetermined limit, the lug 51 strikes the metal frame member and prevents further lateral sliding movement of the fastener, preventing its removal from the frame member. This latch or stop arrangement is also valuable in preventing accidental removal of the fastener from the frame by accidental movement of the wallboard during the erection process.

Corrugations 61 are preferably formed around the fold or bend 13, 15 of the fastener, to strengthen the metal at the bend so as to help it to retain the desired resilient closing force between the parts 11 and 17.

The fact that the front portion 11 projects beyond the edge of the lip 19 of the rear portion aids the quick erection of the fasteners on the flanges. The workman may slap the projecting part of the front portion 11 against the front of the flange by a motion perpendicular to the plane of the wall, then shove laterally on the fastener (parallel to the plane of the wall) to spread the legs of the fastener and force them onto the flange, continuing this shove until he feels the perceptible increase in resistance when the bumps 27 contact with the edge of the flange 31. Erection of the fasteners is thus very rapid.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. A fastener for wallboard and the like, including a metallic plate folded upon itself to provide a front portion and a rear portion, said plate being capable of being forced over an edge of a support with the support embraced between the front and rear portions of the plate, stop means on one of said portions of said plate for contact with the edge of said support to tend to keep the folded edge of said plate spaced laterally from the edge of said support, said stop means being relatively shallow so as to ride over said edge of said support on application of greater force, and a plurality of prongs extending forwardly from the front portion of said plate and constituting means on which wallboard or the like may be impaled to attach said wallboard or the like to said support.

2. A fastener for wallboard and the like, including a resilient metallic plate folded upon itself to provide a front portion and a rear portion, said plate being capable of being forced over an edge of a support with the support embraced between the front and rear portions of the plate, a protuberance extending rearwardly from said front portion to contact with an edge of said support to tend to keep the folded edge of said plate spaced laterally from the edge of said support during installation, the protuberance being adapted to ride over said edge of said support as a result of expansion and contraction forces after installation, and a plurality of prongs extending forwardly from the front portion of said plate and constituting means on which wallboard or the like may be impaled to attach said wallboard or the like to said support.

3. A fastener for wallboard or the like, including a metal plate having a front portion and a rear portion connected to each other along one line, the metal being resilient so that said front and rear portions tend to move toward each other at points spaced from the line of connection, so that said plate may resiliently embrace and grip a supporting member inserted between said front and rear portions, a low abutment protruding from the rear face of said front portion at a point spaced from said line of connection to tend to act as a stop when said plate is installed on said supporting member, to space said line of connection laterally from the adjacent edge of said supporting member while permitting said abutment to ride over said edge of said supporting member upon application of greater force, and prong means projecting forwardly from said front portion of said plate to provide means on which wallboard or the like may be impaled, to attach said wallboard or the like to said supporting member.

4. A fastener for wallboard and the like, including a metallic plate folded upon itself to provide a front portion and a back portion, the fold between said front and back portions including a sharp bend of more than 90° closely adjacent the plane of the front portion so that a hammer blow against the folded edge of said plate will tend to strike said folded edge substantially in the plane of said front portion, said plate being adapted to be placed over an edge of a supporting member in embracing relation thereto, and prong means extending forwardly from said front portion of said plate to provide means of which wallboard or the like may be impaled by driving such wallboard or the like against said front portion of said plate after said plate has been installed on said supporting member.

5. A fastener for wallboard and the like, including a metallic plate folded upon itself to provide a front portion and a back portion, the fold between said front and back portions including a sharp bend of more than 90° closely adjacent the plane of the front portion so that a hammer blow against the folded edge of said plate will tend to strike said folded edge substantially in the plane of said front portion, said plate being adapted to be placed over an edge of a supporting member in embracing relation thereto, a relatively low abutment projecting from the inner face of one of said portions of said plate to contact with an edge of said supporting member when said plate is being installed on said supporting member to tend to space said edge of said supporting member from said folded edge of said plate, said abutment being adapted to ride over said edge of said supporting member upon application of greater force, and prong means extending forwardly from said front portion of said plate to provide means on which wallboard or the like may be impaled by driving said wallboard or the like against said front portion of said plate after said plate has been installed on said supporting member.

6. A fastener for wallboard or the like, including a plate of resilient metal folded upon itself to provide a front portion and a rear portion spaced from each other by a substantial distance adjacent the fold and converging toward each other in a direction away from the fold, said rear portion terminating in a lip curved so as to be convex on its surface faced toward the front portion, and a plurality of prongs projecting forwardly from said front portion to provide means on which wallboard or the like may be impaled, said convex lip on said rear portion being so placed that it will contact with the rear side of the front portion or with the rear side of a supporting member interposed between said front and rear portions approximately along a line arranged centrally behind said plurality of prongs.

7. A fastener for a penetrable panel, including a metallic plate folded upon itself to provide a front portion and a rear portion integrally connected to each other along one side of the fastener by the fold, said portions converging toward each other in a direction away from said fold, said front portion having a free margin extending materially beyond the end of said rear portion in a direction away from said fold, said front portion further having a plurality of panel impaling prongs formed integrally with said front portion and struck up therefrom to project forwardly therefrom and further having a shallow boss embossed from and projecting rearwardly from said front portion at a point between said prongs and said folded edge.

8. A fastener for wallboard or the like, including a metallic plate having a front portion and a rear portion connected to each other along a connecting line, the metal being resilient so that said front and rear portions tend to move toward each other at points spaced laterally from said connecting line, so that said plate may resiliently embrace and grip a supporting member inserted between said front and rear portions, an abutment on one of said portions at a point spaced laterally from said connecting line to tend to act as a stop to space said connecting line laterally from the adjacent edge of said supporting member when said fastener is installed thereon, another abutment on one of said portions at a point spaced farther from said connecting line than the first mentioned abutment, to cooperate with an edge of said supporting member remote from said connecting line to tend to prevent lateral removal of said fastener from said supporting member, and a plurality of wallboard-impaling prongs struck up from said front portion of said plate and extending forwardly therefrom.

9. A wallboard fastener for application to a supporting flange of predetermined width, said fastener including a metallic plate folded upon itself to provide a front portion adapted to lie against the front face of said supporting flange and to extend across the width thereof, and a rear portion adapted to press against the rear face of said flange to embrace said flange resiliently between said front and rear portions of said fastener, a shallow boss extending rearwardly from said front portion near the fold line of said plate to act as a stop to contact with one edge of said supporting flange to space said edge from the fold line of said plate during installation of the fastener, said boss readily riding over said edge of said supporting flange upon application of greater force after installation, an abutment extending rearwardly from said front portion at a point spaced laterally beyond the opposite edge of said supporting flange to contact with said opposite edge of said flange upon lateral movement of said fastener in a removing direction so as to limit the extent of movement in said removing direction, and a plurality of wallboard-impaling prongs extending forwardly from said front portion of said plate.

ROSS WINSHIP.